Jan. 8, 1952        E. A. STALKER        2,581,773

AIRCRAFT ROTOR BLADE AND BLADE FLAP PITCH CONTROL

Filed Nov. 2, 1945        4 Sheets-Sheet 1

INVENTOR.
Edward A. Stalker
BY

Jan. 8, 1952  E. A. STALKER  2,581,773
AIRCRAFT ROTOR BLADE AND BLADE FLAP PITCH CONTROL
Filed Nov. 2, 1945  4 Sheets-Sheet 2
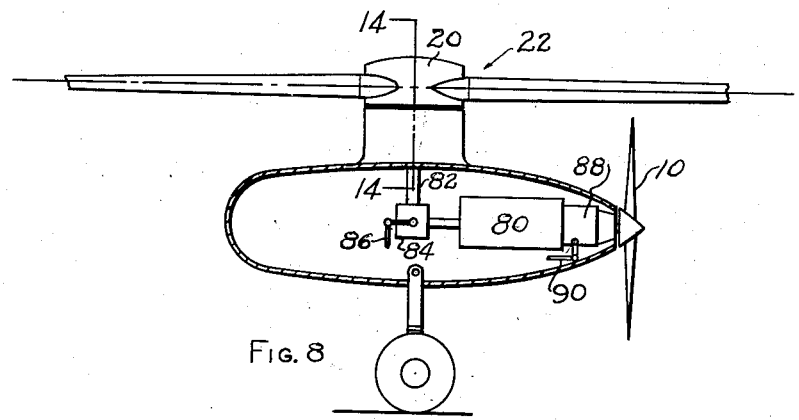
FIG. 8
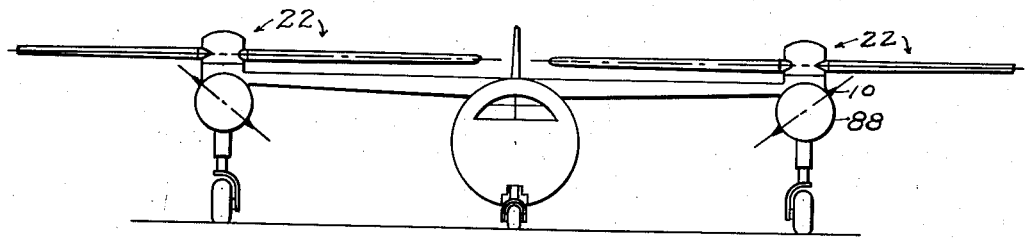
FIG. 6
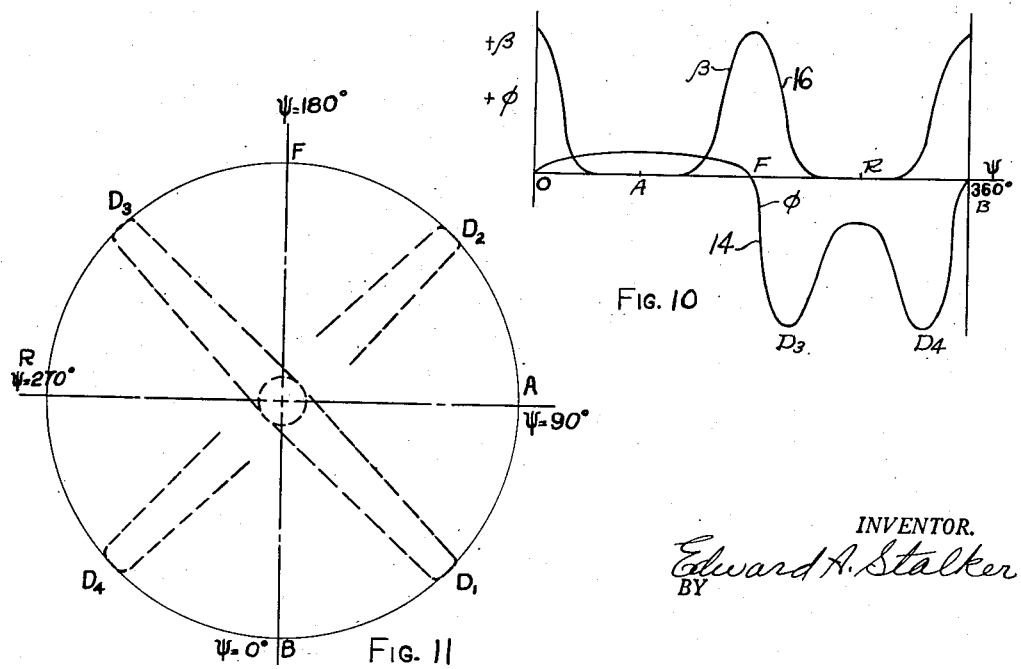
FIG. 10
FIG. 11
INVENTOR.
Edward A. Stalker
BY Jan. 8, 1952 E. A. STALKER 2,581,773
AIRCRAFT ROTOR BLADE AND BLADE FLAP PITCH CONTROL
Filed Nov. 2, 1945 4 Sheets-Sheet 3

INVENTOR.
Edward A. Stalker
BY

Jan. 8, 1952        E. A. STALKER        2,581,773
AIRCRAFT ROTOR BLADE AND BLADE FLAP PITCH CONTROL
Filed Nov. 2, 1945        4 Sheets-Sheet 4
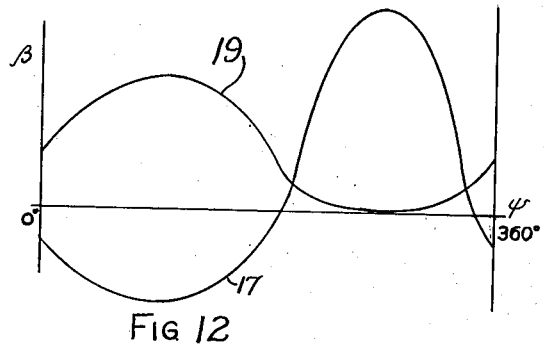
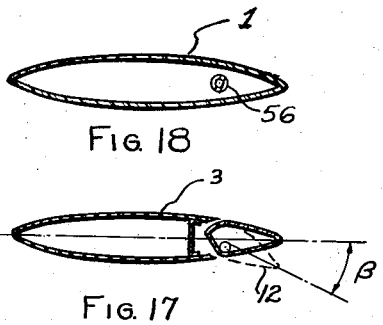
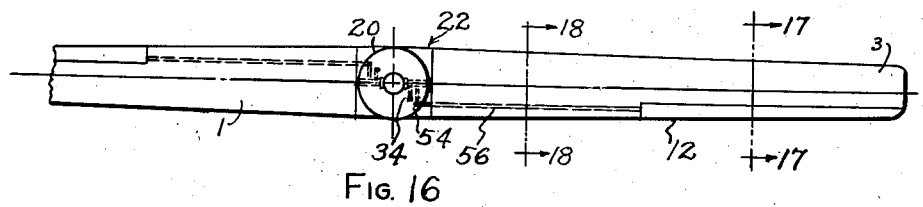
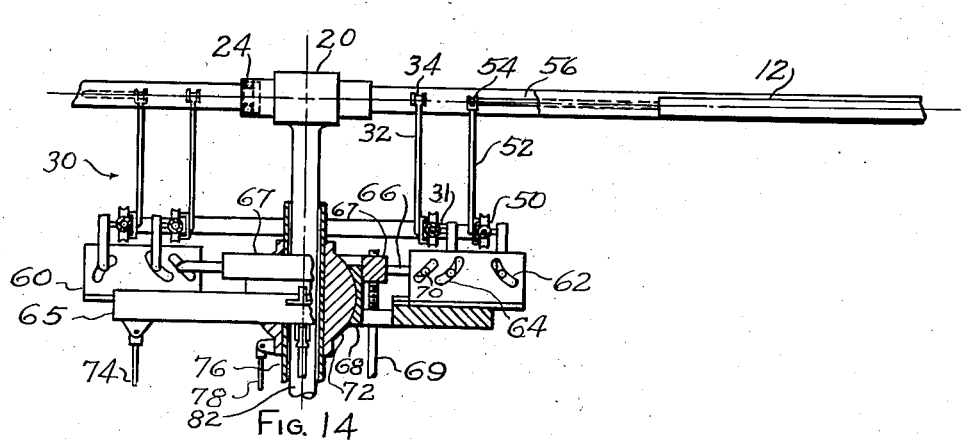
INVENTOR.
Edward A. Stalker
BY

Patented Jan. 8, 1952

2,581,773

UNITED STATES PATENT OFFICE 2,581,773

AIRCRAFT ROTOR BLADE AND BLADE FLAP PITCH CONTROL

Edward A. Stalker, Bay City, Mich.

Application November 2, 1945, Serial No. 626,293

3 Claims. (Cl. 170—160.25)

My invention relates particularly to the lifting rotors of direct lift aircraft and their methods of operation.

It is an object of the invention to provide a lifting rotor which can be operated at high forward speeds and high values of the advance ratio.

Another object is to provide a means of proportioning the power available between the lifting rotor and the means of producing forward thrust.

Other objects will appear from the description, drawings and claims.

I accomplish the above objects by the means illustrated in the accompanying drawings in which—

Figure 6 is a front elevation of the helicopter;

Figure 8 is a side elevation largely diagrammatic of the nacelle of the helicopter of Figure 6;

Figure 10 is a diagram of the variation of pitch and flap angle with orbital position of the blade for an advance ratio greater than unity;

Figure 11 is a diagram illustrating the orbital positions of the blades for use with Figure 10;

Figure 12 is a diagram of the type of Figure 10 for an advance ratio less than unity;

Figure 14 is a fragmentary vertical section along line 14—14 in Figure 8;

Figure 16 is a fragmentary top plan view of the rotor;

Figure 17 is a section along the line 17—17 of Figure 16; and

Figure 18 is a section along the line 18—18 in Figure 16.

It is taught in contemporary work on the helicopter that it is essentially a slow-speed machine, and that its forward speed cannot exceed about 0.4 of the tip peripheral speed, that is, an advance ratio of 0.4.

My invention discloses a means of attaining advance ratios of large magnitudes above 1.0.

A limiting condition in the helicopter occurs when the speed of sound is reached on the advancing wing or blade tip since then the drag mounts seriously. To avoid this I operate the rotor at decreasing tip peripheral speeds as the forward speed is increased and always keep the tip relative wind speed below the sonic velocity. That is, the sum of the translational speed and the tip peripheral speed is always less than sonic speed. I then operate the rotor blades in such a manner to obtain lift from the inboard portion of the retreating blade to make up for the lowered rate of rotation.

Figure 1:
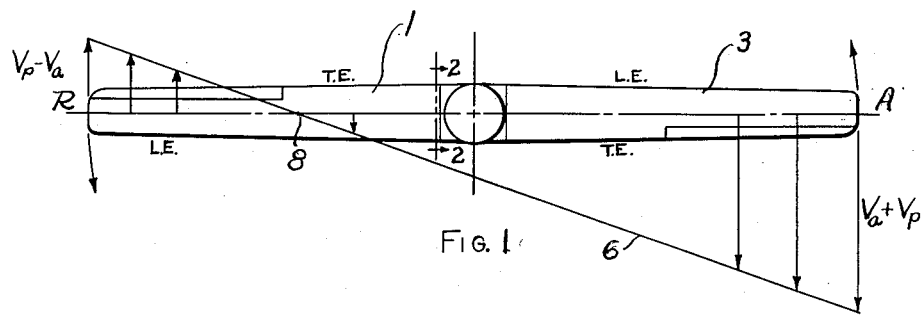
Figure 1 is a diagrammatic top view of a rotor showing the relative wind velocity distribution across the rotor diameter for an advance ratio less than unity.
Figure 2:
Figure 2 is a blade section along line 2—2 of Figure 1.
Figure 3:
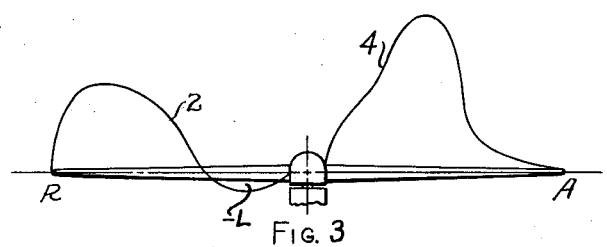
Figure 3 is a diagram of the lift variation across the diameter of a rotor whose advance ratio is less than unity.

Normally the inboard portion of the retreating blade 1 gives a negative lift −L because the relative wind as shown in Figure 1 is reversed over this portion and the angle of attack $\alpha$ is negative as shown in Figure 2. The distributions 2 and 4 of lift along the spans of the retreating and advancing blades respectively are shown in Figure 3.

Figure 4:
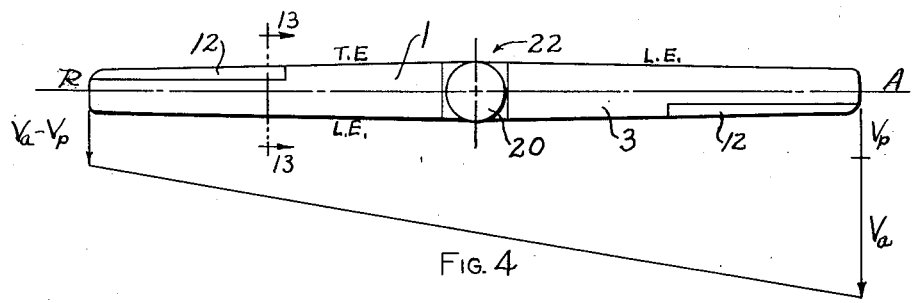
Figure 4 is a diagrammatic top view of a rotor showing the relative wind velocity distribution across the rotor diameter for an advance ratio greater than unity.
Figure 5:
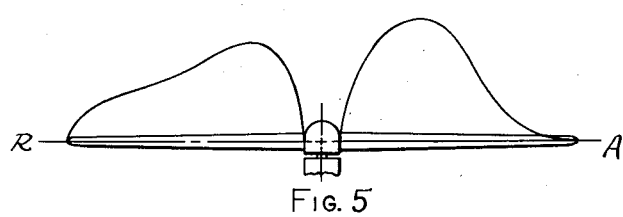
Figure 5 is a diagram of the lift variation across the diameter of a rotor whose advance ratio is greater than unity.

In this invention the rotor is operated at high speed with the velocity distribution shown in Figure 4. The relative wind velocity at the advancing blade A is less than the velocity of sound and the forward velocity is substantially higher than the tip peripheral speed. In fact in Figure 4 it is 2.14 times the tip peripheral speed. Hence, the flow on the retreating blade R is from what is normally the trailing edge (T. E.) to the leading edge (L. E.) along the whole radius. This results in a lift distribution along the radii as shown in Figure 5.

In order to achieve the proper lifts on the blades to make the rotor balance and have a constant total lift with time for such large advance ratios, the blades preferably have special airfoil sections and their angles of attack are varied in a special manner throughout their orbit.

In Figure 1, the blade 3 is shown in the advancing position A and the blade 1 in the retreating position R. I use these symbols, A and R, for the most laterally extending positions, that is, positions perpendicular to the direction of flight. At the tip of the advancing blade the relative air velocity is the sum of the tip peripheral velocity $V_p$ and the velocity of advance $V_a$. At the tip of the retreating blade the relative wind velocity is the difference of $V_p$ and $V_a$. At points between the tips the wind velocity has values corresponding to a straight line variation from tip to tip as indicated by line 6. At a point 8 the relative wind velocity is zero and inboard from this point the relative wind is reversed. That is, it flows from what is normally the trailing edge to the leading edge. As already set forth this leads to a negative angle of attack and a negative lift for the inboard portion of the retreating blade.

In Figure 4 the forward speed ($V_a$) is so high that on both blades the relative wind is in the same direction, that is in the direction opposite to the flight direction of the aircraft. As a result the retreating blade under the special conditions provided is made to carry a positive lift along its whole span outside the hub sides.

The lift of the advancing and retreating blades are adjusted so that the total lift of the rotor remains constant and equal to the weight of the machine for changing orbital positions of the blades.

In order not to encounter large drags arising from supersonic effects the value of $V_p$ in Figure 4 is reduced below the value in Figure 1 and the sum of $V_a$ and $V_p$ is kept below sonic speed by decreasing the rate of rotation as the aircraft is propelled forward at increasing forward speed by the propeller 10 shown in Figure 8.

The airfoil sections of the blades have relatively sharp leading and trailing edges to be suitable for a relative wind attacking either edge.

The orbital variation of lift coefficient on the blade must be different for an advance ratio greater than 1 (Figure 4) than for a ratio less than 1 (Figure 1).

Figure 9:
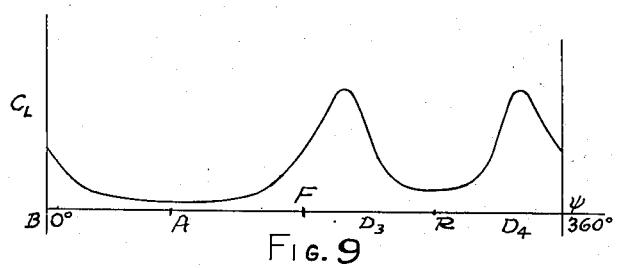
Figure 9 is a diagram of the variation of lift with orbital position of the blade for an advance ratio greater than unity.

A proper variation in lift for the higher advance ratio is shown in Figure 9 wherein it will be observed that the lift coefficient $C_L$ attains two peak values near the $D_3$ and $D_4$ positions as shown in Fig. 11. It is particularly significant that on the retreating side the lift coefficient must be higher for the diagonal positions $D_3$ and $D_4$ than for the most laterally extending position R. The front and back positions (F and B) also have larger values than for the R position.

Such a variation in lift can be attained by various combinations of pitch and flap angles. Figure 10 shows a proper variation of the angle $\phi$ of pitch (curve 14) and of the angle $\beta$ for the flaps (curve 16) to achieve the lift variation shown in Figure 9. The azimuth or orbital angle $\psi$ (psi) is measured from the rear blade position as indicated in Figure 11 by $\psi=0$. Measuring from this position the blade (on the advancing side) increases its positive pitch angle $\phi$ up to approximately $\psi=90°$ then decreases the angle until the front position F is reached at $\psi=180°$. The flap angle $\beta$ may have other values than zero for the R and A positions but they are preferably of approximately equal value as shown in Fig. 10. On the retreating side the pitch is made negative so that the effective angle of attack is positive with respect to the resultant wind which attacks the trailing edge of the retreating wing because the forward speed exceeds the peripheral speed. On this side the pitch is decreased greatly in approaching the diagonal position $D_3$ and then increased in approaching the $\psi=270°$ position. The pitch is again decreased for the $D_4$ position.

It will be noted that this pitch variation is different from what would be required for operation for an advance ratio less than 1.0. For the ratio below 1.0 the pitch angle of the blade in the position R would be made a positive maximum and the pitch at $D_3$ and $D_4$ would be less than at R.

These pitch and flap variations may also be expressed in terms of the true angle of attack measured between the zero lift line of the section and the local relative wind vector found as a resultant of the advance and peripheral velocity vectors. Thus, due to the pitch variation in Figure 10, the angle of attack is positive on the advancing side almost up to F ($\psi=180°$). On the retreating side the angle of attack is a positive maximum at $D_3$ and $D_4$ and still positive at R but of less magnitude than at $D_3$ and $D_4$. Here it must be remembered that the resultant relative wind is still rearward because the advance ratio is greater than 1, and the zero lift line of the section points upward and forward, that is toward the nose of the aircraft. It will be noted that the flap angle $\beta$ is substantially zero for positions R and A but has a maximum angle for both $\psi=0°$ and $\psi=180°$, that is the front and back positions F and B respectively.

Both the pitch and flap angles have minimum magnitudes (but opposite signs) for the retreating position R, when the advance ratio is greater than 1.0 while the reverse is true when the ratio is less than 1.0.

The patterns of pitch and flap variation can be changed since a change in one can always be overridden by a proper change in the other. The fundamental variable, as remarked, is really the lift coefficient of the blade at some representative section along the span of the blade. The lift coefficient follows the pattern shown in Figure 9 and the combination of flap and pitch variations of Figure 10 results in such a curve. It is characterized by the peaks for the $D_3$ and $D_4$ positions of the blades, rising well above the lift coefficient at the retreating position R (270°). The curve shown is for approximately the midpoint of the radius of the rotor.

As remarked just above, a variation in flap setting can offset a variation in pitch setting. This is true even for the flap acting at the nose of the airfoil section. For instance, it will be clear from Figure 13 that lowering the flap 12 can destroy the effective angle of attack $a'$ arising from the use of a negative pitch angle. The blade has a negative pitch angle ($-\phi$) when it has a positive angle of attack $a'$ with respect to the wind vector $V_a$ arising from the forward speed which exceeds the tip peripheral speed $V_p$.

Figure 13:
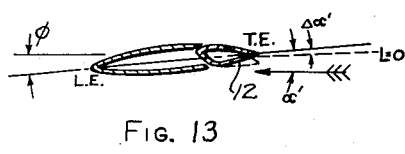
Figure 13 is a blade section along line 13—13 Figure 4 shown in relation to the relative wind vector of advance.
Figure 15:
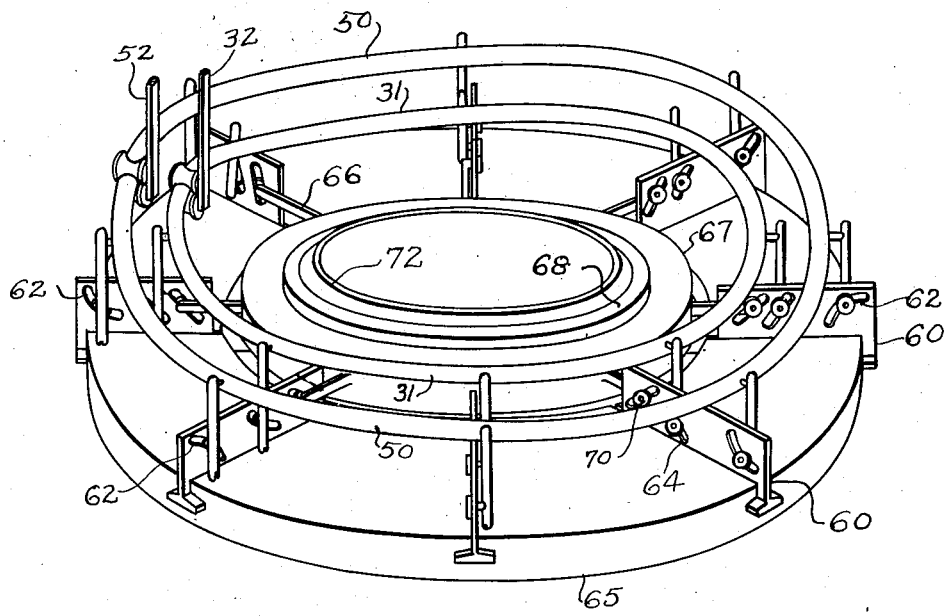
Figure 15 is a perspective view of the ring cam assembly.
Figure 7:
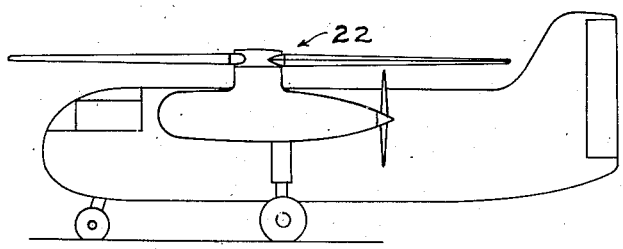
Figure 7 is a side elevation of the helicopter.

The true or effective angle of attack is always to be measured with respect to the zero lift line (marked L=0) of the section as shown in Figure 13 and the local relative wind vector which is the resultant of the vectors due to forward speed and rotation and any other effect which may be present. This zero lift line is to be found by the well-known method due to Munk. It will be observed that lowering the flap decreases the angle of attack by $\delta a'$.

The variation in lift coefficient is accomplished by the mechanism shown in Figures 14 to 18.

The blades 1 and 3 and hub 20 compose the lifting rotor 22. As shown particularly in Figure 14, the blades are individually mounted in bearings 24 for rotation with respect to the hub about a spanwise axis.

The pitch attitude of the blades is controlled by the cam assembly 30 (Figures 14 and 15) whose ring cam 31 is operably connected by links 32 to the arms 34 fixed to the shanks of the blades.

The flaps are controlled by another ring cam 50 similar to 31. Link 52 is operably connected from the cam to the arm 54 fixed to the torque tube 56 in turn fixed to the inner end of the flap 12.

The configuration of the two-ring cams are related through slideable slotted plates 60. (See Figure 15 particularly.) Outer slots 62 and inner slots 64 are of appropriate shape to give ring cams 50 and 31 the correct contours for controlling the flap and pitch angles in coordination.

The plates 60 are slidable in the plate 65 by arms 66 fixed to ring 67 borne for vertical sliding on part 68. The pilot can adjust the position of ring 67 by turning rod 69 which is threaded through the ring. The vertical movement of the ring moves roller 70 vertically and slides plate 60 horizontally.

Since plate 65 is universally mounted on the ball 72 it can be tilted by a suitable rod 74 and another spaced 90 degrees around from it, both articulated to the plate 65. Plate 65 and ball 72 may also be slid vertically on the tubular bearing 76 by means of rod 78.

Each helicopter rotor is turned by the engine 80 connected to the rotor shaft 82 by means of the variable speed drive 84 which can be operated by the pilot by means of control rod 86.

The engine also drives the variable pitch propeller 10 to provide a propulsive force perpendicular to the axis of shaft 82 (which is also the rotor axis of rotation). As the speed of forward flight increases less power is applied to the rotor 22 and more to the propeller 10. To decrease the power going to the rotor the variable speed transmission is operated to reduce the rate of rotation of the rotor. To absorb the power of the engine 80 the pitch of the propeller 10 is increased and its rate of rotation is increased by means of the variable speed transmission 88 actuated by the pilot by means of control rod 90.

The engine 80 and the propeller 10 may be considered a power means whose power is in part applied to the rotor to rotate it while part is used in the propeller. As the speed of flight is increased progressively more power is expended through the thrust-producing propeller and less through the lift-producing rotor. This is possible since more and more lift arises from the forward speed.

The principal feature of this invention is the provision of means for operating a helicopter at an advance ratio greater than 1. To do so unique attitudes are given to both the advancing and retreating blades. For instance, the retreating blade is rotated in pitch in the most laterally extending position so that its outer portion has a positive angle of attack with respect to the relative wind vector due to the advance. In contemporary helicopters the positive angle of attack is with respect to the relative wind vector due to the rotation.

Furthermore, the pitch of the blade in the most laterally extending position is different from the pitch in the diagonal position on either side of the most lateral extending position. Thus the true angle of attack between the blade and the local relative wind is more positive for the diagonal positions than for the most laterally extending positions. The conventional helicopter (advance ratio less than 1) has the opposite order of magnitudes of angles of attack.

The invention also consists in providing suitable mechanical features to execute the variation in lift with orbital position and in providing for flight at low advance ratios in a machine capable of attaining high advance ratios.

I have now described suitable embodiments of my invention which are now preferred. It is to be understood however that the invention is not limited to the particular construction illustrated and described and that I intend to claim it broadly as indicated by the scope of the appended claims.

I claim:

1. In combination, in an aircraft, a blade supported for rotation about an upright axis and for pitch adjustment, said blade having an adjustable flap, means operable cyclically to adjust the pitch of said blade, additional means for cyclically adjusting the attitude of said flap relative to said blade separately from said pitch adjustment, and means for coordinating the operation of one of said adjusting means with the other.

2. In combination in a direct lift aircraft, a rotatable blade, means mounting said blade for rotation about an upright axis, means for adjusting the lift of said blade, a tiltable control plate, a deformable cam mounted on said plate, means in running contact with said cam operably connected to said adjusting means to cyclically alter the blade lift in accordance with variations in said cam contour, means to deform said cam to alter the orbital lift pattern of said blade, and means to tilt said plate to displace said cam relative to said adjusting means to actuate said adjusting means to superimpose a lift change on the lift alteration induced on said blade by deforming said cam.

3. In combination in a direct lift aircraft, a rotatable blade, means supporting said blade for rotation about an upright axis, two separate means for adjusting the lift of said blade, a deformable cam for each of said adjusting means, means in running contact with each said cam operably interconnecting each said cam with its respective said adjusting means, means controlled by each said cam for causing orbital variations in blade lift in accordance with variations in the contour of its associated cam, and means to deform said cam contours in coordinated relation with each other.

EDWARD A. STALKER.

REFERENCES CITED

The following references are of record in the file of this patent:

UNITED STATES PATENTS

| Number | Name | Date |
| --- | --- | --- |
| 1,254,496 | Goldsworthy | Jan. 22, 1918 |
| 1,449,129 | Pescara | Mar. 20, 1923 |
| 1,792,014 | Herrick | Feb. 10, 1931 |
| 1,813,852 | Isacco | July 7, 1931 |
| 1,900,689 | Baum | Mar. 7, 1933 |
| 1,917,965 | Gerhardt | July 11, 1933 |
| 1,982,968 | Stalker | Dec. 4, 1934 |
| 1,993,701 | Avery | Mar. 5, 1935 |
| 1,994,488 | Sikorsky | Mar. 19, 1935 |
| 2,317,340 | Bennett | Apr. 27, 1943 |
| 2,389,798 | Main | Nov. 27, 1945 |
| 2,425,651 | Stalker | Aug. 12, 1947 |